United States Patent [19]

Tolmie et al.

[11] Patent Number: 5,636,147

[45] Date of Patent: Jun. 3, 1997

[54] METHOD OF PROVIDING ULTRASOUND ELECTRICAL IMPEDANCE MATCHING CIRCUITS

[75] Inventors: Bernard R. Tolmie, Shelburne; Mark Haviland, Waitsfield; Paul Smith, Shelburne, all of Vt.

[73] Assignee: Vermont Electromagnetics Corp., Williston, Vt.

[21] Appl. No.: 406,043

[22] Filed: Mar. 17, 1995

[51] Int. Cl.⁶ .................................................. G06F 15/60
[52] U.S. Cl. ............................................ 364/578; 73/861
[58] Field of Search ................... 73/632, 861; 128/660; 367/12; 364/578

[56] References Cited

PUBLICATIONS

"Modeling and Optimization of High–freq. Ultrasound Transducers" Geoffrey R. Lockwood, IEEE Transactions on Ultrasonics, vol. 41, Mar. 1994, pp. 225–230.

*Primary Examiner*—Kevin J. Teska
*Assistant Examiner*—A. S. Roberts
*Attorney, Agent, or Firm*—Thomas N. Neiman, Esq.

[57] ABSTRACT

The method of providing ultrasonic electrical impedance matching circuits is designed to provide the ability to analyze a large number of variable parameters in order to obtain a quick and simplified read out for the tuning of ultrasonic signals. This is done in order to evaluate these signals based upon the electrical model of an ultrasound system. A computer program is disclosed that provides the basis for this method and results in a highly accurate and immediate analysis of the ultrasound system.

7 Claims, 7 Drawing Sheets

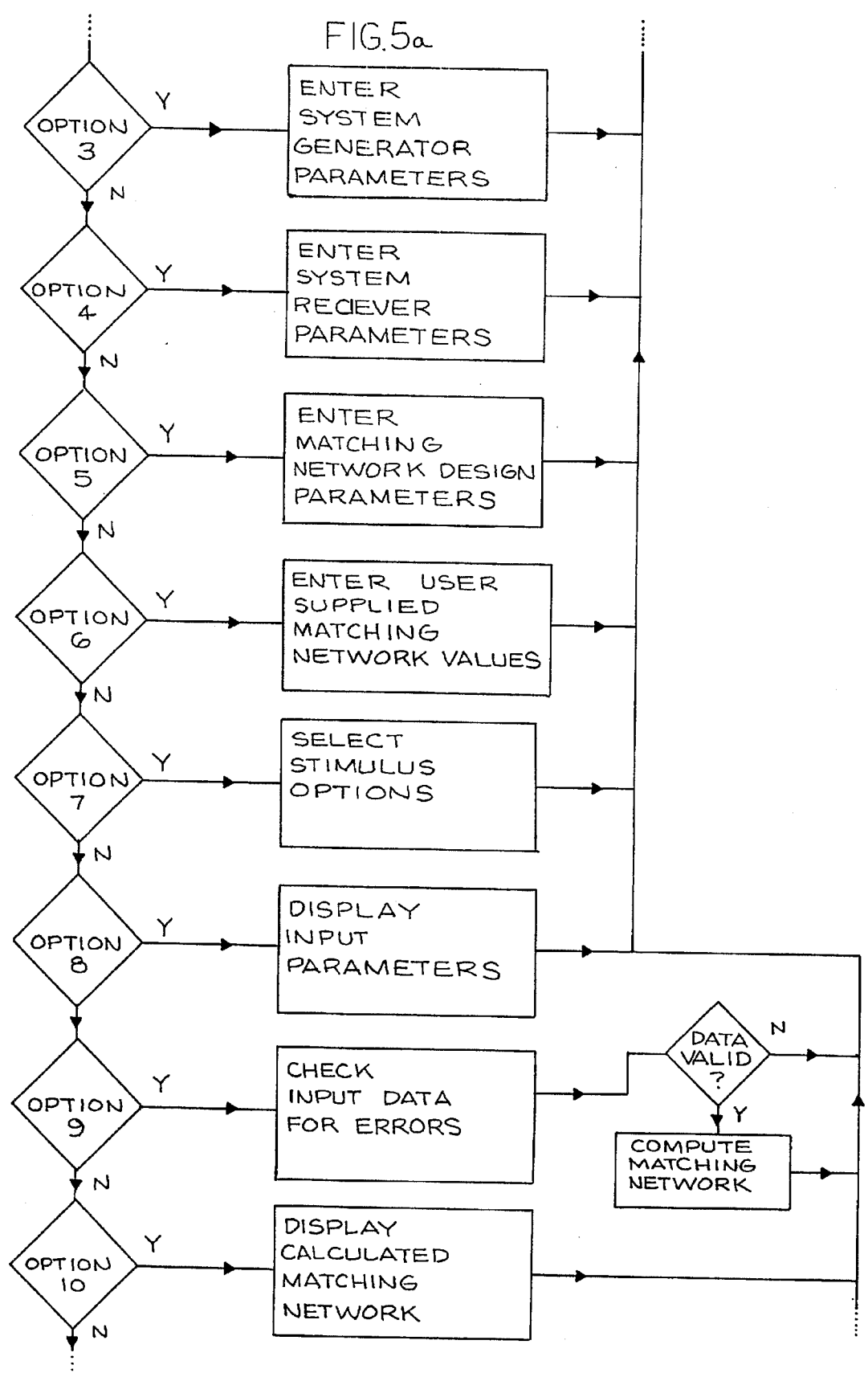

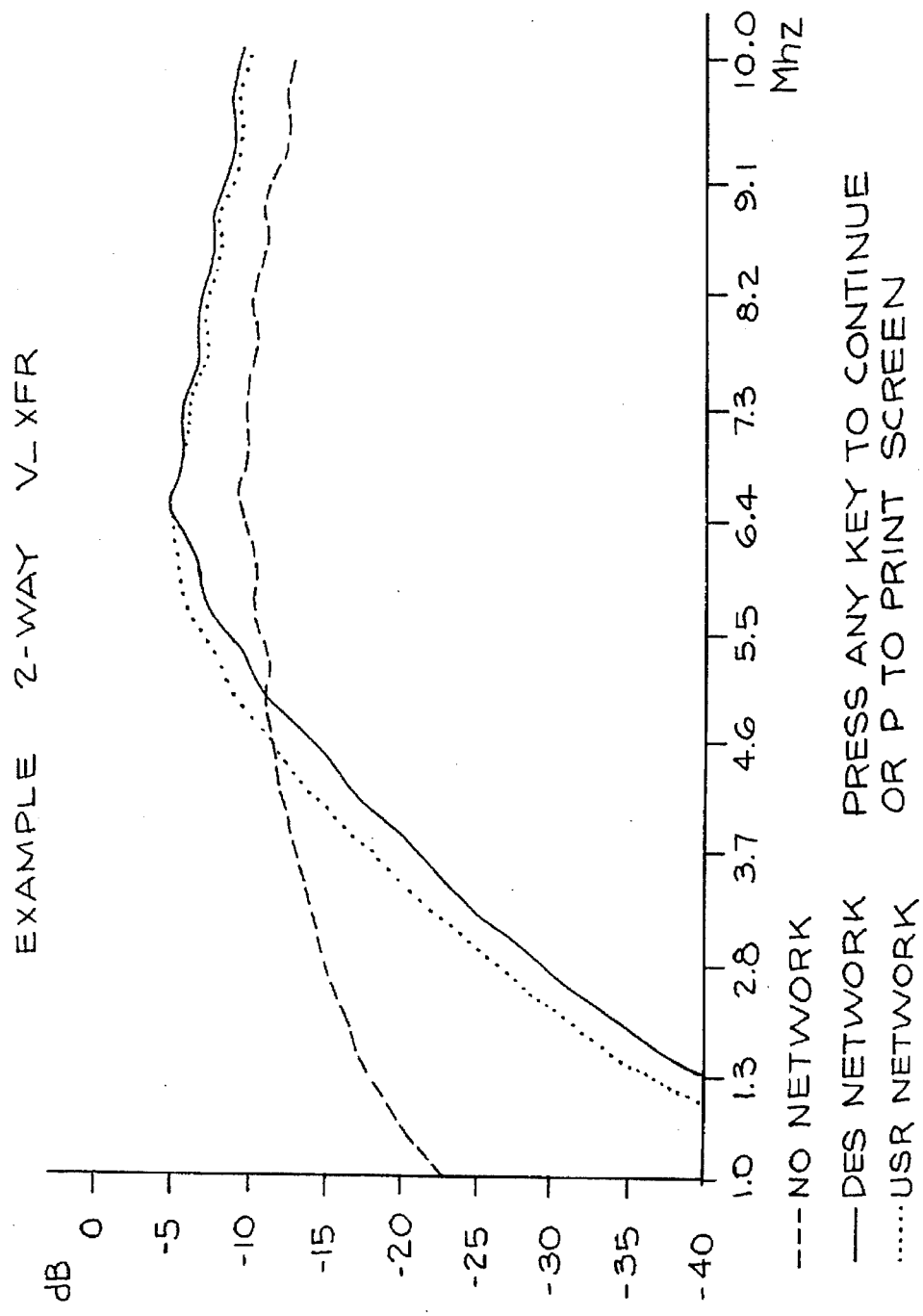

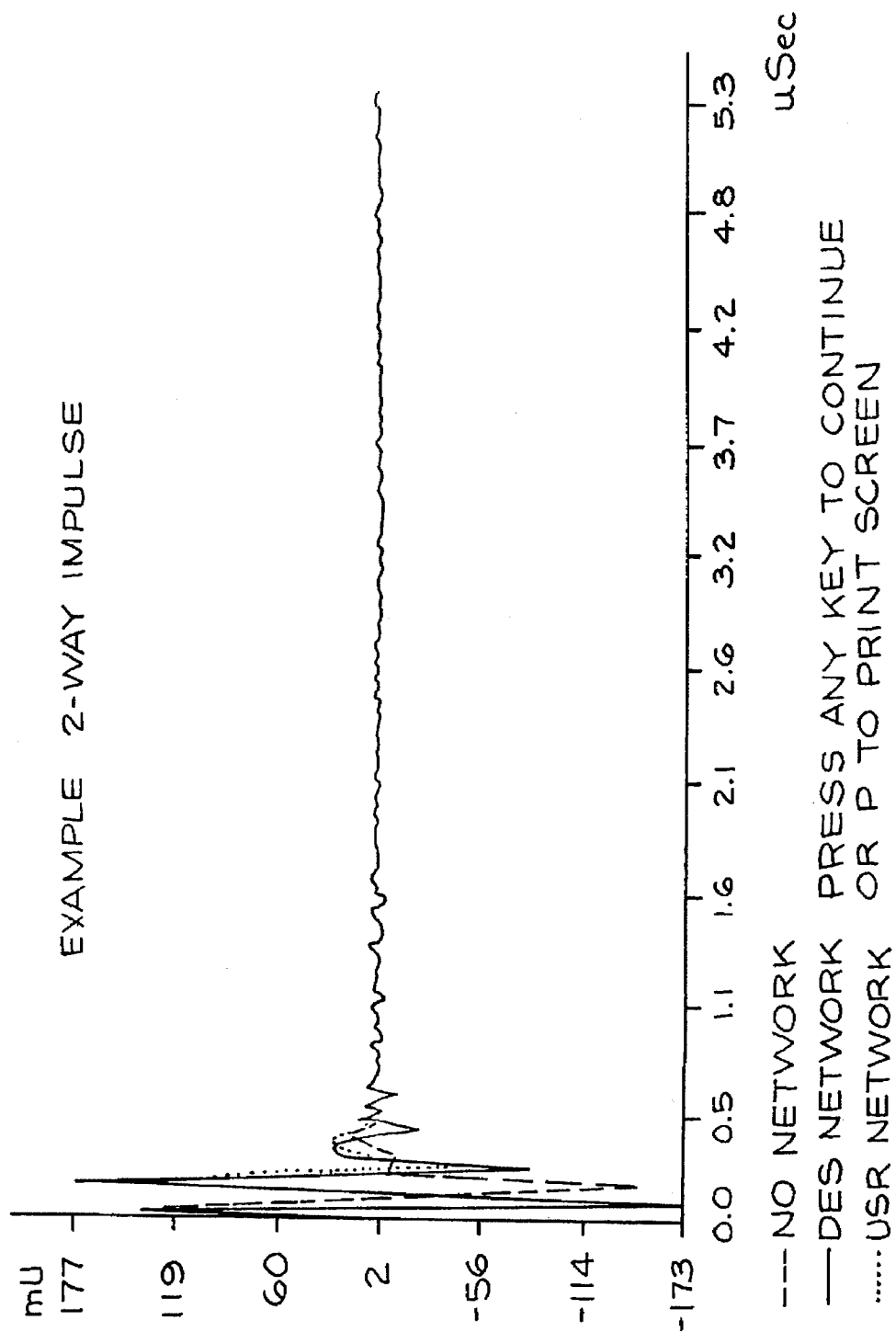

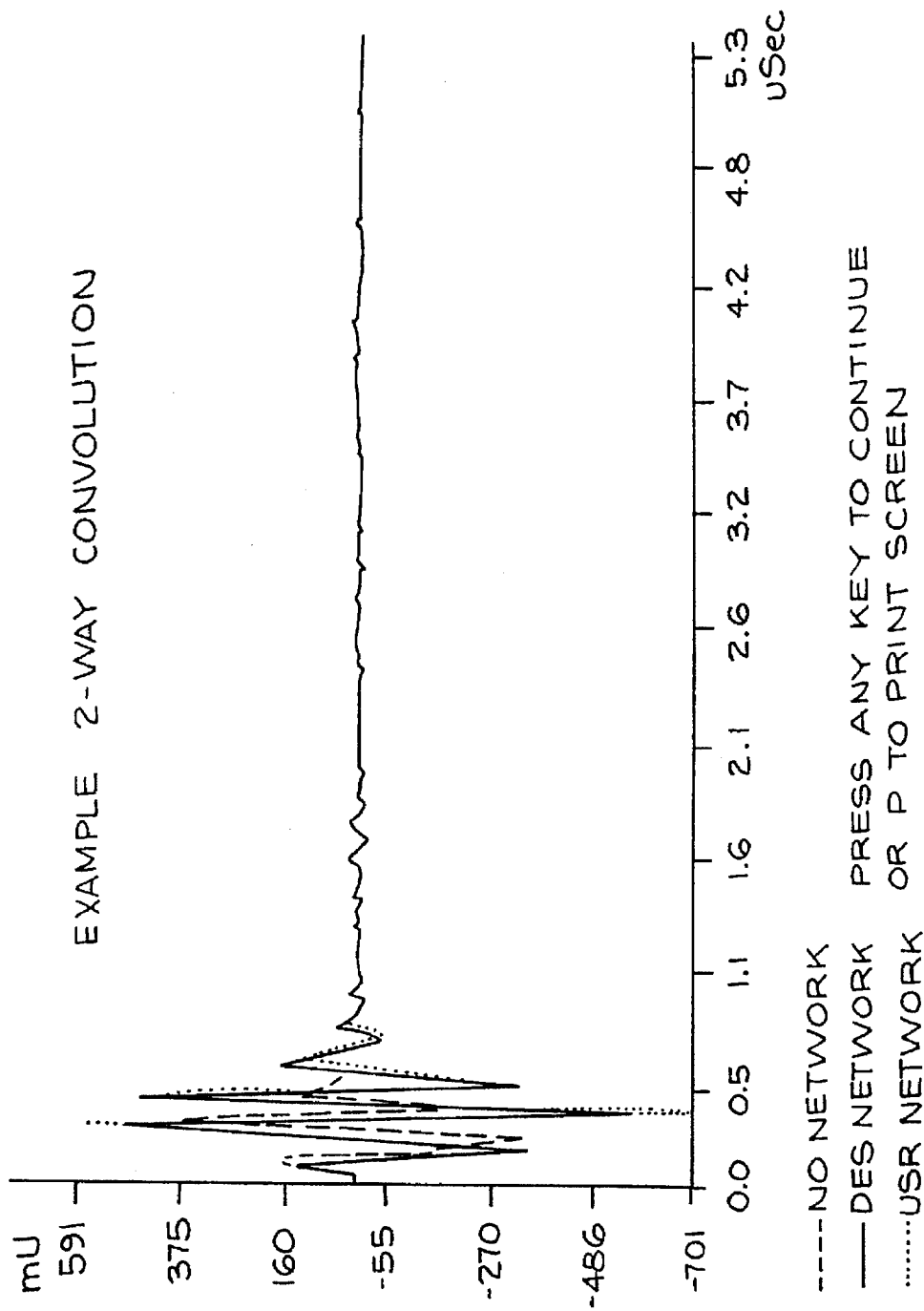

METHOD OF PROVIDING ULTRASOUND ELECTRICAL IMPEDANCE MATCHING CIRCUITS

BACKGROUND OF THE INVENTION

This invention pertains to electrical circuits, and, in particular, to a method of providing an ultrasound electrical impedance matching circuit which incorporates the use of a computer software program to accomplish this goal.

There have been a number of attempts to design systems to match and evaluate ultrasonic system characteristics. The reason an ultrasound system is such a problem is that the return signal is transmitted over the same coaxial cable as the receive signal. The receive signal is 120 dB down from the transmitted signal. This means that maintaining the lowest possible attenuation during the transmission of the received signal from the acoustic medium of the transducer to the electrical medium of the system controller is imperative. The tuning circuits calculated by the matching software make this goal attainable. This is a desirable goal in order to make the ultrasound system perform more accurately and thereby give better results in its designated uses. What has not been accomplished is a system that will provide the best impedance matching of a transducer to a fixed single ultrasound cable impedance and with different ultrasound system receiver transmitter impedance elements with inductors and capacitors. All components—transducer, cable, rectifier, transmitter—have different impedances and the software will select the electrical matching component to provide the best two way voltage transfer. Another element that has not been accomplished is the design of a system which will select the nearest commercially available components and will display a schematic of the closest matching network circuit. No current systems are available that specialize in medical ultrasound system matching and also allow for the incorporation of characteristic data from a microminature coaxial cable.

Clearly, it is desirable for a method for producing ultrasound electrical impedance matching circuits which is simple to use and, at the same time, be very accurate and effective. It is also a worthwhile purpose to produce a program that will permit the user to use experimental or theoretical data to be selected when inputting parameters from the cable impedance or loss information, from the transducer impedance data, and the system generator and or receiver impedance data. An object of this invention is to provide a method that provides the user with a simple and easy installation of the program with no external pieces in order for it function. It is an object of this invention to set forth an improved method of providing ultrasound electrical impedance tuning circuits thus improving signal to noise ratio, bandwidth and two way voltage transfer which avoids the disadvantages, limitations, above-recited, obtained from other circuit matching systems.

SUMMARY OF THE INVENTION

Particularly, it is the object of this invention to set forth a method of providing ultrasound electrical impedance matching circuits, for use in order to evaluate the effectiveness of the operating circuit, comprising the steps of storing in a software package an electrical model of an ultrasound in the transmitting mode which gives values to the system generator output voltage, the system output impedance, the transducer input impedance, the voltage at the transducer and the cable system; storing in a software package an electrical model of an ultrasound system in the receiving mode which gives values to the impedance of the receiver, the transmitter transducer output impedance, the transducer's induced output voltage, the voltage at the receiver and the cabling system; modeling the transducer and the transmitting/receiving switch; cable; determining the design frequency impedance; determining the end to insert the matching network; transforming the transducer or transmitting/receiving switch to the other end of the transmission line; calculating the matching network based upon the fixed and rotated impedance; inserting the matching network into the ultrasound system and simulating and evaluating the ultrasound system.

BRIEF DESCRIPTION OF THE DRAWINGS

Further objects and features of this invention will become more apparent by reference to the following description taken in conjunction with the accompanying figure, in which:

FIG. 6 is a graphical representation of the voltage transfer of the system;

FIG. 7 is a graphical representation of the impulse response of the system; and

FIG. 8 is a graphical representation of the convolution response of the system.

DETAILED DESCRIPTION OF THE PREFERRED EMBODIMENT

As shown in the figures, the novel method of providing ultrasound electrical impedance matching circuits allows the operator to be able to use the software that is capable of designing a one or two component circuit that will tune the impedance of a transducer to an ultrasound cable and system receiver elements and, at the same time, automatically select the nearest commercially available components and displays a schematic of the matching network circuit. As shown in figures one and two, the software program has modeled the ultrasound system in the transmitting mode with the system generator output voltage being given the value Vg, the system output impedance being given the value Zg, the ultrasound cabling system being labeled the cable, the transducer electrical impedance given the value X1 and the voltage at the transducer given the value Vx. The modeling of the ultrasound system in the receiving mode with the receiver impedance is given the value Zr, the transducer electrical impedance given the value X1, the transducer's induced voltage given the value Vx, the voltage at the receiver given the value Vr and the ultrasound cabling system being labeled cable. These parameters can be derived from the lumped element networks, piezoelectric analysis or from impedance values measured with an impedance analyzer test equipment.

Figure 1:
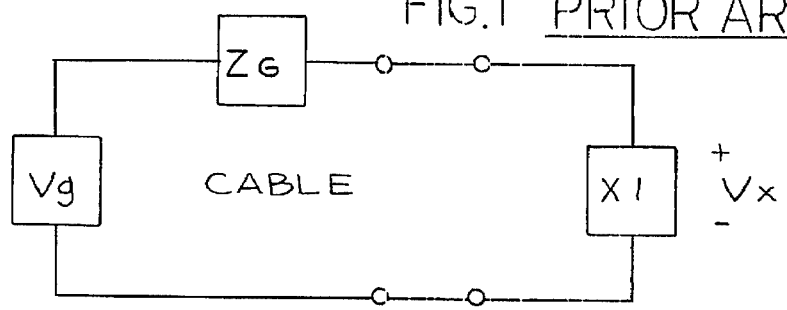
FIG. 1 is a schematic view of the ultrasound system in the transmitting mode.
Figure 2:
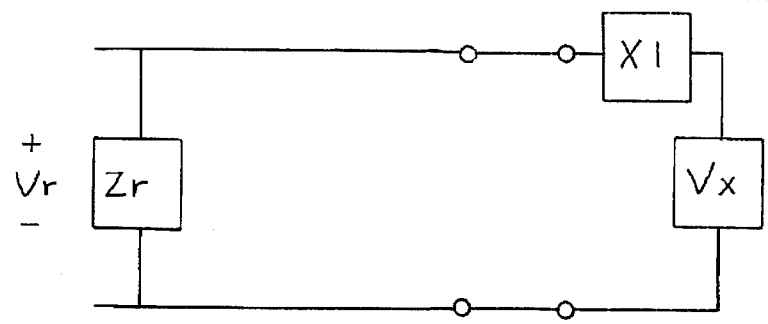
FIG. 2 is a schematic view of the ultrasound system in the receiving mode.
Figure 3:
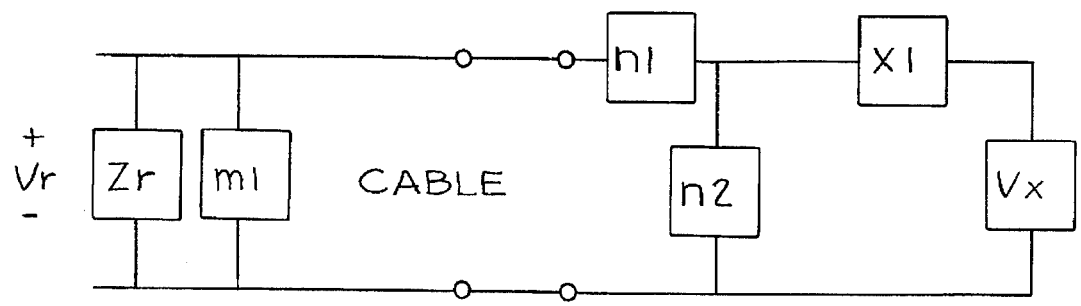
FIG. 3 is a schematic view of the matching network being inserted into the ultrasound system in the receiving mode.
Figure 4:
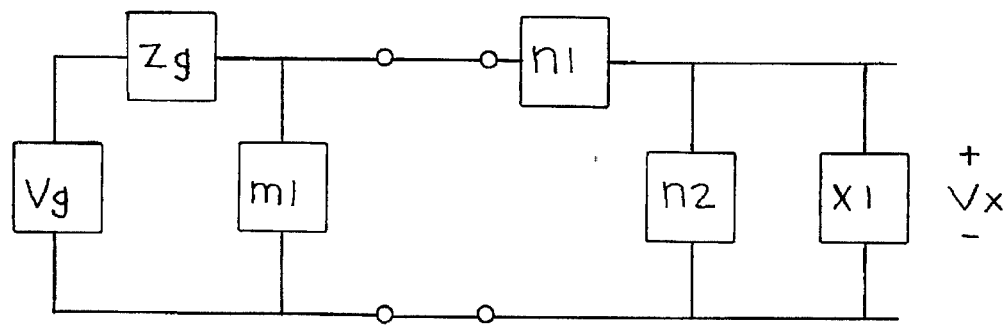
FIG. 4 is a schematic view of the matching network being inserted into the ultrasound system in the transmitting mode.
Figure 5:
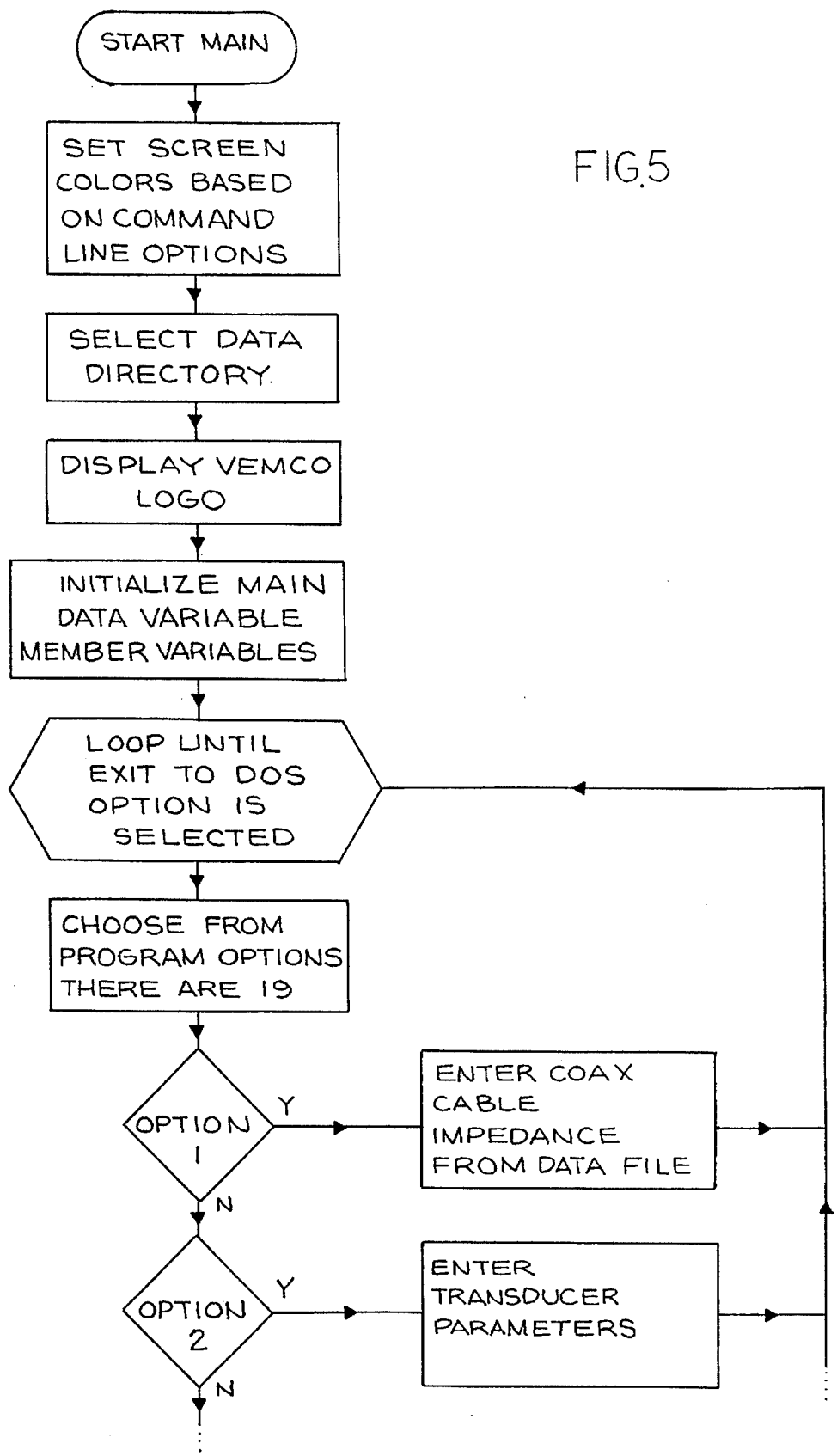
FIG. 5 is a block diagram of the novel software program.
Figure 5B:
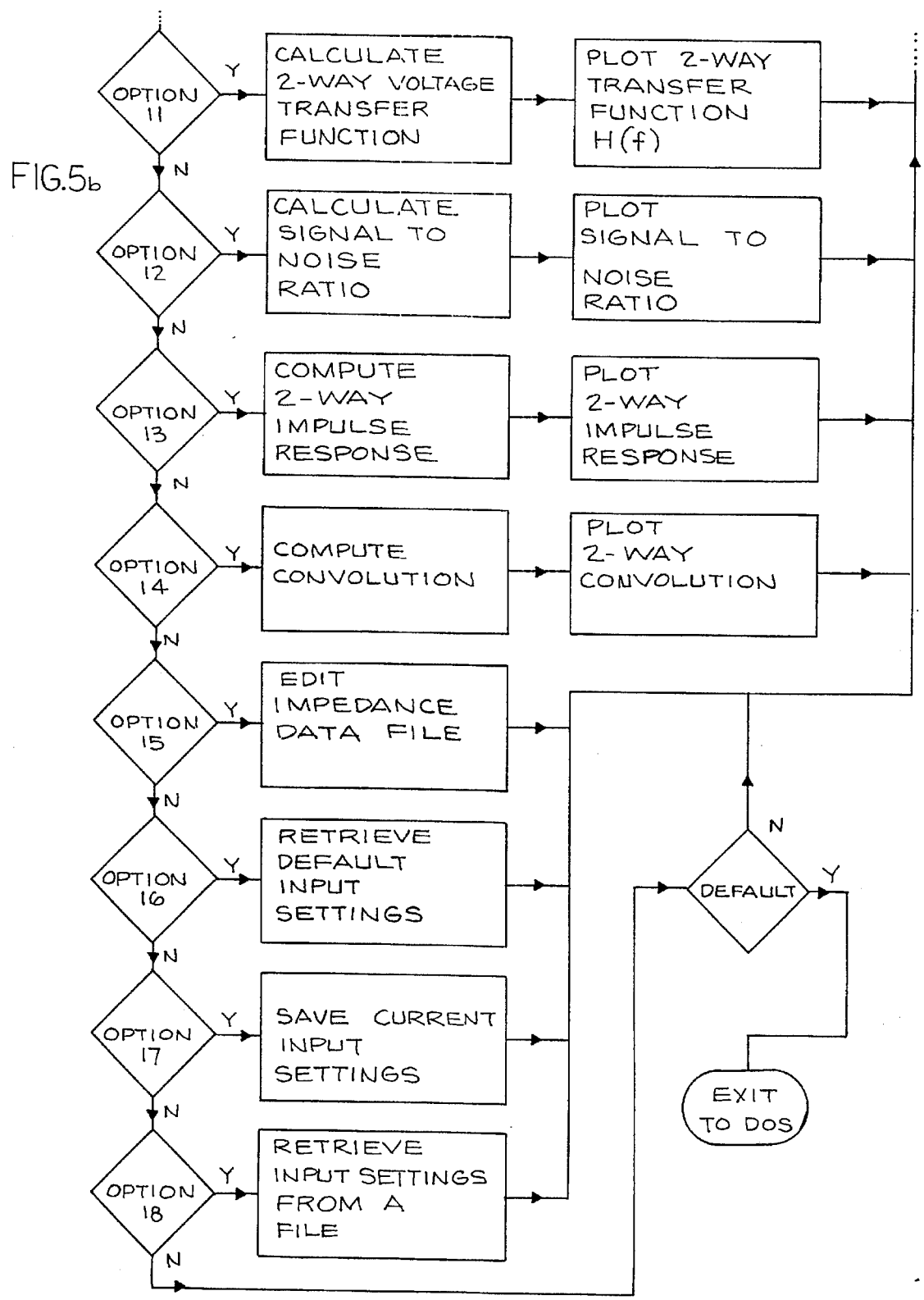

The program uses the concepts of transmission line theory which measures the physical length of the transmission line, the input impedance at some frequency with the line open and the input impedance at the frequency with the line short circuited. The transmitting/receiving switch cable and transducer can be modeled at either the system or transducer interface connectors. The design frequency impedances are determined and the end into which to insert the matching network is determined. The transducer or transmitting/receiving switch impedance is transformed to the other end of the transmission line. The matching network is calculated based upon the reactance of the fixed and rotated impedances and the matching network is inserted into the ultrasound system as shown in FIG. 3 (the receiving mode) and FIG. 4 (the transmitting mode). In those schematics, m1 is the parallel inductor network and n1 and n2 are inductor and capacitor of a PI network. The software designs a tuning circuit based upon the impedance matching and maximum voltage transfer and uses the capacitance of the cable to design the PI network to have only two instead of three components.

The software program uses a number of parameters such as design frequency, cable and transducer impedance list, piezoelectric parameters, system transmitting/receiving elements, the length of the cable, and the network type. The software processes the input parameters into a matching network to design for maximum power and voltage transfer across a wide frequency band. The output parameters of the software are the schematics shown and the plots of a two way voltage transfer (which is defined as the voltage of the receiver divided by the voltage of the generator and is closer to zero when the tuning network is utilized), the signal to noise ratio of the received signal, the two way impulse response of the ultrasound system (defined as the inverse fourier transform of the voltage transfer function), cable and transducer electrical port and the convolution of the system response with a real stimulus (defined as the convolution of the system impulse response with a given input stimulus function) as shown in FIGS. 6, 7 and 8. One of the advantages of the software system is its ability to compare the system response with the tuning network versus without the tuning network.

Among the future embodiments of the novel method and means is the capability to be able to have an electronic bulletin board delivery system version of the novel software. An outline of the software operating instructions is presented below to clarify the functions of the software.

MATCHING NETWORK SOFTWARE MAIN MENU

> Enter Coaxial Cable Parameters

Enter Transducer Parameters

Enter System Transmitter Parameters

Enter System Receiver Parameters

Enter Matching Network Design Parameters

Enter User Supplied Matching Network Values

Select Stimulus Options

Display Input Parameters

Compute Matching Network

Display Calculated Matching Network

Calculate And Plot 2-way Voltage Transfer Function

Calculate And Plot S/N Ratio

Calculate And Plot 2-way Impulse Response

Calculate And Plot Convolution With a Stimulus

Edit An ASCII Data File

Retrieve Default Input Settings

Save Current Input Settings To Disk

Retrieve Input Settings From Disk

Return To MS-DOS

Use the ↑ and ↓ keys to highlight option, then press enter

The general sequence for correct operation of the software is to use the first five options on the menu to enter the system parameters and then compute the matching network. After the network is computed, various output parameters and functions can be examined. An example illustrates this procedure.

Example

Select the coaxial cable parameters option (option 1). The file selection list shown below will appear on the display.

CABLE IMPEDANCE FILE SELECTION OPTION

Use PgUp and PgDn keys to view other files, press esc to quit

| FILENAME | start(mhz) | stop(mhz) | step(mhz) | no of pts | Impedance | Cap/ft(pF) |
|---|---|---|---|---|---|---|
| 36110N1.CBL - 1.00000 | 13.00000 | 0.50000 | 25 | 52 | 30.84 | |
| 36110N2.CBL - 1.00000 | 13.00000 | 0.10000 | 121 | 4 | 30.84 | |
| 36110N3.CBL - 1.00000 | 12.90625 | 0.09375 | 128 | 52 | 30.84 | |
| 38050D1.CBL - 1.0 | 13 | .5 | 25 | 80 | 15.2 | |
| 38050D2.CBL - 1.0 | 13 | .1 | 121 | 80 | 15.2 | |
| 38050D3.CBL - 1.0 | 12.90625 | 0.09375 | 128 | 80 | 15.2 | |
| 38065D1.CBL - 1.0 | 13 | .5 | 25 | 56 | 19.8 | |
| 38065D2.CBL - 1.0 | 13 | .1 | 121 | 56 | 19.8 | |
| 38065D3.CBL - 1.0 | 12.90625 | 0.09375 | 128 | 56 | 19.8 | |
| 38110G1.CBL - 1.0 | 13 | .5 | 25 | 53 | 33.5 | |
| 38110G2.CBL - 1.0 | 13 | .1 | 121 | 53 | 33.5 | |
| 38110G3.CBL - 1.0 | 12.90625 | .09375 | 128 | 53 | 33.5 | |
| 40050D1.CBL - 1.0 | 13 | .5 | 25 | 93 | 15.24 | |
| 40050D2.CBL - 1.0 | 13 | .1 | 121 | 93 | 15.24 | |
| 40050D3.CBL - 1.0 | 12.90625 | 0.09375 | 128 | 93 | 15.24 | |

Use the ↑ and ↓ keys to highlight option, then press enter

The list shows all the coaxial cable impedance data files that exist in the current data directory. Select the 36110N3.CBL file. As indicated by the program, this file contains 128 frequency data points with the start frequency being 1 mhz, a step frequency of 0.09375 Mhz, and a stop frequency of 12.90625 Mhz. The open circuit/ short circuit impedance data for this cable now exists as a parameter in the program. An example of a cable impedance file is shown in section 8. This file can be produced using a text editor or the impedance measurement program "mcoax.exe" in the utility directory. All file must have the format illustrated be the example file.

Now, from the main menu, select the transducer parameters option (2nd option) and the following menu will be displayed. This menu allows the user to specify the transducer as an impedance file or as a lumped element device.

---

TRANSDUCER PARAMETERS ENTRY OPTIONS MENU

PIEZOELECTRIC PARAMETERS ARE SELECTED

> Enter transducer electrical device parameters

Enter transducer piezoelectric device parameters

Toggle between electrical or piezoelectric device

Exit to main menu

Use the ↑ and ↓ keys to highlight option, then press enter

---

TRANSDUCER PARAMETER ENTRY OPTION

IMPEDANCE DATA IS SELECTED

> List transducer file names and select file

Enter or edit a transducer lumped element network

Toggle between impedance data or lumped elements

Exit to main menu

Use the ↑ and ↓ keys to highlight option, then press enter

---

Select the first option from this menu and the following file list will be displayed. The transducer is more accurately modeled from impedance data. From the file list select the probe6.xdr transducer file. Notice that this file contains the same step frequency as the 36110N3.CBL file. This must be the case in order for the software to compute the matching network. An example of a transducer data file is shown. This file can be produced using a text editor or the transducer measurement program "mxdcr.exe" in the utility directory.

---

TRANSDUCER IMPEDANCE FILE SELECTION OPTION

Use PgUp and PgDn keys to view other files, press esc to quit

| FILENAME<br>Design(mhz) | - | start(mhz) | stop(mhz) | step(mhz) | no of | pts |
|---|---|---|---|---|---|---|
| PROBE1.XDR | - | 1.0 | 10 | .5 | 19 | 7.5 |
| PROBE2.XDR | - | 1.0 | 10 | .1 | 91 | 6.0 |
| PROBE3.XDR | - | 1.0 | 10 | .5 | 19 | 6.0 |
| PROBE4.XDR | - | 1.0 | 13 | .1 | 121 | 7.0 |
| PROBE5.XDR | - | 1.0 | 12.90625 | 0.09375 | 128 | 5.0 |
| >PROBE6.XDR | - | 1.0 | 12.90625 | 0.09375 | 128 | 7.5 |
| PROBE7.XDR | - | 1.0 | 6 | .5 | 11 | 3.5 |
| PROBE8.XDR | - | 1.0 | 13 | .1 | 121 | 3.0 |
| PROBE9.XDR | - | 1.0 | 13 | .1 | 121 | 3.0 |
| TEST.XDR | - | 1.00000 | 10.00000 | 0.50000 | 19 | 7.50 |
| TETRAD.XDR | - | 1.00000 | 13.00000 | 0.10000 | 121 | 7.50 |
| XDR.XDR | - | 1.0 | 10 | 1.0 | 10 | 7.0 |

Use the ↑ and ↓ keys to highlight option, then press enter

---

Toggle the transducer parameters to the impedance data mode and return to the main menu.

Select the system transmitter parameter entry option, (3rd option). The following menu is displayed. The menu is very similar to the transducer menu. For the transmitter, you will select the enter or edit a transmitter lumped element network option.

---

TRANSMITTER PARAMETER ENTRY OPTION

LUMPED ELEMENT DATA IS SELECTED

List transmitter file names and select file

> Enter or edit a transmitter lumped element network

Toggle between impedance data or lumped elements

Exit to main menu

Use the ↑ and ↓ keys to highlight option, then press enter

---

The following menu is the element entry option for the transmitter notice that there are no elements entered yet. This menu is identical for the receiver, and user matching network options.

---

TRANSMITTER ELEMENT ENTRY OPTION

YOU MAY ENTER UP TO 6 ELEMENTS FOR THIS NETWORK

There are no elements entered yet

>Enter a new element

Edit an existing element

Delete an existing element

Delete the network

Return to previous menu

Use the ↑ and ↓ keys to highlight option, then press enter

---

Select the enter a new element option and second menu of the element entry option will be displayed. Here, the order for entering elements is important. If the device is a on the left (ie transmitter or receiver), the element nearest to the device output ports is entered first. If the device is on the right (ie transducer), the element nearest to the device output port is the last element entered.

The parallel RLC leg is a RESISTER / INDUCTOR / CAPACITOR in a series configuration but parallel to the circuits to its left and right. The series RLC leg is a RESISTER / INDUCTOR / CAPACITOR in a parallel configuration but serial to the circuits to its left and right.

---

GENERATOR ELEMENT ENTRY OPTION

SELECT AN ELEMENT FROM BELOW

Parallel capacitor

Series capacitor

Parallel Inductor

Series Inductor

Parallel Resistor

> Series Resistor

Parallel RLC leg

Series RLC leg

Return to previous menu

Enter capacitance in pFs

ENTER DATA AND PRESS <F5> KEY

---

Enter first a series 25 resister and then a 125 Pf capacitor. After you the enter the capacitor, the screen should resemble the following.

---

GENERATOR ELEMENT ENTRY OPTION

YOU MAY ENTER UP TO 6 ELEMENTS FOR THIS NETWORK

There are 2 elements entered

ELEMENT # 1 IS A 25.00 series resistor

ELEMENT # 2 IS A 125.00 Pf parallel capacitor

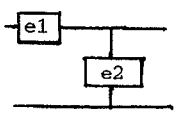

Enter a new element

Edit an existing element

Delete an existing element

Delete the network

---

Return to previous menu

Use the ↑ and ↓ keys to highlight option, then press enter return to the main menu and then select the system receiver parameters option. As you can see, the receiver menu is identical to the transmitter menu.

---

RECEIVER PARAMETER ENTRY OPTION

LUMPED ELEMENT DATA IS SELECTED

List receiver file names and select file

>Enter or edit a receiver lumped element network

Toggle between impedance data or lumped elements

Exit to main menu

Use the ↑ and ↓ keys to highlight option, then press enter

---

Select the lumped element network option and enter a single parallel 100 resister. The screen will be as follows. Return to the main menu.

---

RECEIVER ELEMENT ENTRY OPTION

YOU MAY ENTER UP TO 6 ELEMENTS FOR THIS NETWORK

There are 1 elements entered

ELEMENT # 1 IS A 100.00 parallel resistor

>Enter a new element

Edit an existing element

Delete an existing element

Delete the network

Return to previous menu

Use the ↑ and ↓ keys to highlight option, then press enter

---

From the main menu, select the matching network design parameters option and enter the values indicated below.

MATCHING NETWORK DESIGN PARAMETERS

The end for network can be either 'S' for system, 'T' for Transducer or 'B' for both ends The network type can be 'PL' for a parallel inductor network or 'LC' for a LC PI or T network

```
Enter title for output report       EXAMPLE  any name
Select end for network              S    system
Select system end network type      PL   parallel inductor
Select transducer end network type  LC   doesn't matter since end =
                                         S
Enter start frequency in Mhz        1.00    select range within
Enter stop frequency in Mhz         10.00 the cable's sampled range
Enter design frequency in Mhz       7.5
Enter cable length in inches        100.00
```

PRESS THE <F5> KEY TO ACCEPT DATA OR <ESC> TO QUIT

---

Return to the main menu and select the display input parameters. View the parameters and verify that you have entered all the information correctly.

INPUT PARAMETERS DISPLAY OPTION

CABLE INPUT PARAMETERS

Cable impedance file name :        36110N3.CBL

Cable description :                Sumitomo 36110N cable

Number of data points in file :    128

```
                Sampled impedance start frequency :   1.00000 Mhz

Sampled impedance stop frequency :    12.90625 Mhz

Sampled cable length :                107.00 inches

Cable impedance at stop frequency :   52.98705  -4.89033

5                  PRESS ANY KEY TO CONTINUE, or Q TO QUIT
    ─────────────────────────────────────────────────────────────────────

INPUT PARAMETERS DISPLAY OPTION

TRANSDUCER PARAMETERS

Impedance file name :                 PROBE6.XDR

File description :                    7.5 Mhz xdcr with 128 pt
10              Number of data points in file :       128

Sampled impedance start frequency :   1.00000 Mhz

Sampled impedance stop frequency :    12.90625 Mhz

IMPEDANCE MODE IS SELECTED

There are no elements entered yet

15                  PRESS ANY KEY TO CONTINUE, or Q TO QUIT
    ─────────────────────────────────────────────────────────────────────

INPUT PARAMETERS DISPLAY OPTION

SYSTEM GENERATOR PARAMETERS

Impedance file name :  NO FILE SELECTED

LUMPED ELEMENT MODE IS SELECTED
20                        There are 2 elements entered ELEMENT # 1 IS A 25.00   series resistor ELEMENT # 2 IS A 125.00 Pf parallel capacitor
```

14

PRESS ANY KEY TO CONTINUE, or Q TO QUIT

---

INPUT PARAMETERS DISPLAY OPTION

SYSTEM RECEIVER PARAMETERS

Impedance file name :   NO FILE SELECTED

LUMPED ELEMENT MODE IS SELECTED

There are 1 elements entered

ELEMENT # 1 IS A 100.00   parallel resistor

PRESS ANY KEY TO CONTINUE, or Q TO QUIT

---

INPUT PARAMETERS DISPLAY OPTION

DESIGN INPUT PARAMETERS

Set up for EXAMPLE

The design end :      System

Type of matching network at the system end :   Parallel L

Type of matching network at the transducer end :   LC pi or T

Design start frequency :           1.00000 Mhz

Design stop frequency :            10.00000 Mhz

Matching design frequency :        7.50000 Mhz

Design cable length :              100.00 inches

PRESS ANY KEY TO CONTINUE, or Q TO QUIT

---

INPUT PARAMETERS DISPLAY OPTION

USER NETWORK PARAMETERS - SYSTEM END

There are no elements entered yet

PRESS ANY KEY TO CONTINUE, or Q TO QUIT

INPUT PARAMETERS DISPLAY OPTION

USER NETWORK PARAMETER - TRANSDUCER END

There are no elements entered yet

PRESS ANY KEY TO CONTINUE, or Q TO QUIT

PIEZOELECTRIC PARAMETERS

Coupling coefficient, (k)              - 0.000
Clamped dielectric constant, (eps)     - 0.000
Acoustic velocity, (vel) in m/s        - 0.000
Piezoelectric thickness, (th) in mm    - 0.000
Piezo acoustic impedance, (z) in MR    - 0.000
Piezo mechanical loss tangent, (tgm)   - 0.000
Piezo electrical loss tangent, (tge)   - 0.000
Effective area, (ea) in mms            - 0.000
Front medium impedance, (zfm) in MR    - 0.000
Backing medium impedance, (zb) in MR   - 0.000
Number of front layers                 - 0
Number of back layers                  - 0

PRESS ANY KEY TO CONTINUE, or Q TO QUIT

CONVOLUTION STIMULUS OPTIONS

STIMULUS IS AN INTERNALLY GENERATED WAVEFORM

OF Type  - Positive Going Square Waveform

Running at 0.0 Mhz

For 0.0 cycles

PRESS ANY KEY TO CONTINUE

---

Notice that the last 5 screens have no information. You will complete these after you have computed the matching circuit and viewed the output parameters.

Select the compute matching network option followed by the display output parameters option. The following screens will be displayed.

---

OUTPUT PARAMETERS FOR EXAMPLE

Design Frequency :   7.50 Mhz

Start Frequency  :   1.00 Mhz

Stop Frequency   :   10.00 Mhz

Design Length    :   100.00 INCHES

Designed Network Is At The System End

Cable Impedance At Design Frequency :        53.06 +j -6.26

Transmitter Impedance At Design Frequency : 24.47 +j -3.59

Transducer Impedance At Design Frequency : 124.31 +j -116.49

Receiver Impedance At Design Frequency :    100.00 +j 0.00

Impedance Seen By Receiver :                 23.32 +j -43.44

Impedance Seen By Transducer :               55.76 +j -37.25

PRESS 'P' TO PRINT SCREEN AND CONTINUE OR ANY OTHER KEY TO CONTINUE

---

TRANSMIT MODE

CIRCUIT DIAGRAM FOR EXAMPLE W/ DESIGNED NETWORK

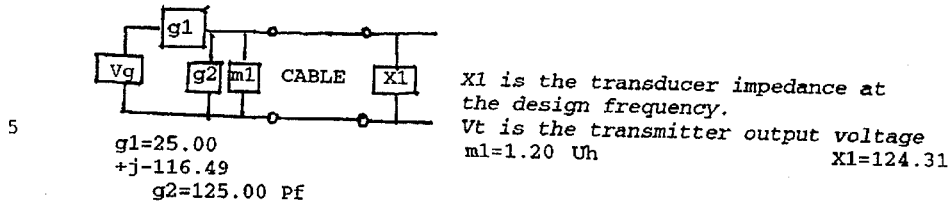

g1=25.00
+j-116.49
g2=125.00 Pf

X1 is the transducer impedance at
the design frequency.
Vt is the transmitter output voltage
m1=1.20 Uh          X1=124.31 t1 and t2 are the transmitter lumped elements
m1 is the matching network

PRESS 'P' TO PRINT SCREEN AND CONTINUE OR ANY OTHER KEY TO CONTINUE

---

RECEIVE MODE

CIRCUIT DIAGRAM FOR EXAMPLE W/ DESIGNED NETWORK

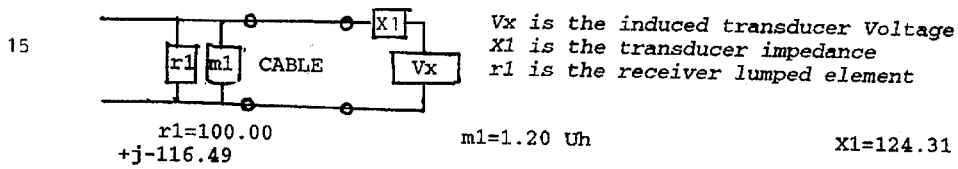

r1=100.00
+j-116.49 m1=1.20 Uh                    X1=124.31

Vx is the induced transducer Voltage
X1 is the transducer impedance
r1 is the receiver lumped element

PRESS 'P' TO PRINT SCREEN AND CONTINUE OR ANY OTHER KEY TO CONTINUE

---

TRANSMIT MODE

CIRCUIT DIAGRAM FOR EXAMPLE W/ USER DEFINED NETWORK

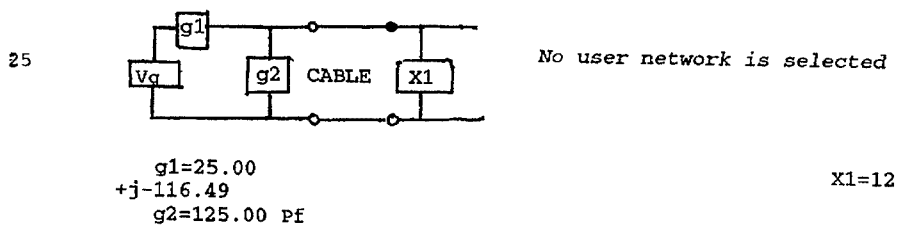

g1=25.00
+j-116.49
g2=125.00 Pf

No user network is selected

X1=124.31

PRESS 'P' TO PRINT SCREEN AND CONTINUE OR ANY OTHER KEY TO CONTINUE

---

RECEIVE MODE

CIRCUIT DIAGRAM FOR EXAMPLE W/ USER DEFINED NETWORK

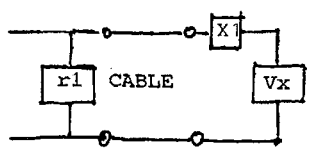

r1=100.00
+j-116.49

X1=124.31

PRESS 'P' TO PRINT SCREEN AND CONTINUE OR ANY OTHER KEY TO CONTINUE

Now go to the user supplied matching network option and select the enter/edit network at system end option. As with the system transmitter and receiver, enter a lumped element value. Make this value 1.5 H since it is close to the value 1.2 H selected by the software.

USER SELECTED MATCHING NETWORK ENTRY OPTION

>Enter/Edit network at system end

Enter/Edit network at transducer end

Return to main menu

Use the ↑ and ↓ keys to highlight option, then press enter

USER SELECTED MATCHING NETWORK ENTRY OPTION
YOU MAY ENTER UP TO 6 ELEMENTS FOR THIS NETWORK

There are no elements entered yet

> Enter a new element

Edit an existing element

Delete an existing element

Delete the network

Return to previous menu

Use the ↑ and ↓ keys to highlight option, then press enter

---

When you are finished, the network should be as follows.

USER SELECTED MATCHING NETWORK ENTRY OPTION

YOU MAY ENTER UP TO 6 ELEMENTS FOR THIS NETWORK

There are 1 elements entered

ELEMENT # 1 IS A 1.50 H parallel inductor

- Enter a new element

Edit an existing element

Delete an existing element

Delete the network

Return to previous menu

Use the ↑ and ↓ keys to highlight option, then press enter

---

Now select the stimulus option and choose to enter an internal waveform.

---

STIMULUS OPTIONS

INTERNAL WAVEFORM SELECTED

List Stimulus file names and select file

>Select from internal waveforms Square, Sine, etc

Exit to main menu

Use the ↑ and ↓ keys to highlight option, then press enter

Select a positive going 5 mhz 2 cycle square wave as
demonstrated below.

INTERNAL WAVEFORM ENTRY OPTION

SELECT A WAVE TYPE FROM BELOW

> Positive Going Square Wave

Negative Going Square Wave

Sine Wave

Return To Previous Menu

Use the ↑ and ↓ keys to highlight option, then press enter

INTERNAL WAVEFORM ENTRY OPTION

SELECT A WAVE TYPE FROM BELOW

Positive Going Square Wave

Negative Going Square Wave

Sine Wave

Return To Previous Menu

Enter Waveform Frequency in Mhz    7.5

ENTER DATA AND PRESS <F5> KEY

INTERNAL WAVEFORM ENTRY OPTION

SELECT A WAVE TYPE FROM BELOW

Positive Going Square Wave

Negative Going Square Wave

Sine Wave

Return To Previous Menu

Enter Number of Cycles                    2

ENTER DATA AND PRESS <F5> KEY

---

Notice that you can select the stimulus waveform option and view the available external waveform files. For now, do not choose a file, just press the <Esc> key.

---

STIMULUS WAVEFORM FILE SELECTION OPTION

Use PgUp and PgDn keys to view other files, press esc to quit

FILENAME

>CHIRP.WAV- 128 point Stimulus Waveform with decreasing frequency

EXP.WAV  - 128 point exponential stimulus waveform

Use the ↑ and ↓ keys to highlight option, then press enter

---

Return to the main menu and choose the save current input settings to disc. The following screen will be displayed. Save the settings under the name "EXAMPLE". No file extensions are accepted.

---

SAVE INPUT SETTINGS OPTION

ENTER FILE NAME TO SAVE SETUP TO    EXAMPLE

ENTER DATA AND PRESS <F5> KEY

---

SAVE INPUT SETTINGS OPTION

ENTER SETUP DESCRIPTION   EXAMPLE   FOR PROCEDURE 100-94003-00

ENTER DATA AND PRESS <F5> KEY

---

5      Now go to the retrieve input settings from disk option
       and select the example.inp file that you just created.
       Display the input parameters and verify that you still
       have all the same parameters.

---

INPUT SETTINGS FILE SELECTION OPTION

10     Use PgUp and PgDn keys to view other files, press esc to quit

FILENAME

23EWR.INP      —

ASDFSF.INP     —

DEMO1.INP      — DEMO SETUP #1 - 5 MHZ PROBE

15    >EXAMPLE.INP   — EXAMPLE FOR PROCEDURE 100-94003-00

Use the ↑ and ↓ keys to highlight option, then press enter

---

Now try retrieving some of the other input settings if
       they exist or simply using the retrieve default input
       setting option.  View the input parameters and see that
20     they have changed.  Retrieve the settings saved as
       EXAMPLE.INP to continue with this procedure.

Select the 2-way voltage transfer function option and
       view the curve plots.  Note that a D marks the design
       frequency.

25     Select the S/N Ratio (signal to noise ratio) option and
       view the curve plots.

Select the 2-way impulse response option and view the curve plots.

Select the convolution with a stimulus option and view the curve plots.

Now return to the main menu, select the transducer parameters menu, toggle the piezoelectric option, and select the piezoelectric parameters menu option. The piezoelectric parameters menu shown below will be displayed.

---

PIEZOELECTRIC PARAMETERS ENTRY OPTIONS MENU

>Enter piezoelectric element parameters

Enter/Edit front layers

Enter/Edit back layers

Exit to transducer menu

Use the ↑ and ↓ keys to highlight option, then press enter

---

Select the piezoelectric materials option and enter data as shown below.

---

PIEZOELECTRIC MATERIAL PARAMETERS ENTRY OPTION

The design frequency for the xdcr is 2.500 Mhz

Coupling coefficient, (k)                  - 0.510

Clamped dielectric constant, (eps)         - 635.000

Acoustic velocity, (vel) in m/s            - 4600.000

Piezoelectric thickness, (th) in mm        - 0.920

Piezo acoustic impedance, (z) in MR        - 34.500

Piezo mechanical loss tangent, (tgm)       - 0.004

Piezo electrical loss tangent, (tge)       - 0.002

Effective area, (ea) in mms                - 283.530

Front medium impedance, (zfm) in MR        - 1.500

Backing medium impedance, (zb) in MR- 8.000

Return to piezoelectric parameters menu

Use the ↑ and ↓ keys to highlight option, then press enter

---

Now select the front layers option and enter the data shown below.

---

FRONT LAYER ENTRY/EDIT OPTIONS MENU

Enter new layer

Edit existing layer

Delete layer

Delete all layers

Exit to piezoelectric parameters menu

Use the ↑ and ↓ keys to highlight option, then press enter

---

LAYER MATERIAL PARAMETERS ENTRY OPTION

Acoustic velocity, (vel) in m/s     - 2650.000

Layer thickness, (th) in mm -        0.291

Layer acoustic impedance, (z) in MR - 5.500

Layer mechanical loss tangent, (tgm) - 0.030

Return to layer entry/edit parameters menu

Use the ↑ and ↓ keys to highlight option, then press enter

---

Now run the matching network calculation and note that the transducer electrical impedance is ~ 16 - j 31 at 2.5 Mhz.

Run the impulse response option and note that the impulse of the piezoelectric transducer and system (without matching network) is as shown in figure 17. This is a much more detailed response than would be seen with a transducer that was represented by lumped elements or electrical impedance data. Therefor whenever possible, the piezoelectric representation of a transducer is the preferred type.

Now exit the transducer parameters options and select the design parameters option and enter 2.5 mhz for the design frequency. This is equal to the design frequency of the piezoelectric element parameters.

GENERAL OPERATING INSTRUCTIONS SEQUENCE REVIEW

1) Select a cable file.
2) Select transducer file or lumped element network.
3) Select system transmitter file or lumped element network.
4) Select system receiver file or lumped element network.
5) Enter matching network design parameters.
6) Run matching calculation and view calculated matching network.
7) View response curves.
8) If desired, enter user specified network and/or a system stimulus.
9) View the response curves and the convolution.
10) Try different stimulus functions.
11) Save input setup parameters to a disk file for later use.

EDITING AN ASCII FILE

From the main menu, select the edit an ASCII file.

The editor will load and a screen will appear. This is a full ascii editor with mouse capability.

Select the file option located on the pull down menu and load one of the impedance files. The cable impedance files all have extensions .cbl, the transducer files have the extension .xdr, the generator files have extension .trm, and the receiver files have extension .rcv. In addition, system stimulus waveform files have the extension .wav.

Select a cable file such as the 36110N3.CBL.

Files can be altered and renamed or saved under the same name.

Exit the editor by selecting the exit option on the file pull down menu.

Any file that is currently selected for use in an impedance matching setup should be reloaded using one of the first three options under the main menu of the matching software before any new matching design or analysis is attempted.

IMPEDANCE FILE FORMATS

Cable impedance files - A valid cable impedance file is shown below.

```
36110n1.cbl      file name
Sumitomo 36110N cable    file description
   this line must be blank
start(mhz) stop(mhz) step(mhz) no of pts   Impedance  Cap/ft(Pf)
Line Length(in)
1.00000    13.00000   0.50000      25         52        30.84
107.00
Cartesian    coordinate system (cartesian or polar)
                OPEN (OHMS)              SHORT (OHMS)   this data
obtained from
FREQ (MHZ)   REAL     IMAG          REAL     IMAG     the impedance
analyzer
```

```
1.00000    1.8000   -575.9000    6.4070    5.0180
1.50000    2.1000   -382.5000    6.5380    7.5270
2.00000    2.1000   -285.5000    6.7310   10.0470
2.50000    2.2000   -227.0000    6.9600   12.6000
3.00000    2.3000   -187.6000    7.2400   15.1800
3.50000    2.4000   -159.4000    7.5700   17.8100
4.00000    2.5000   -138.0000    7.9500   20.4800
4.50000    2.6000   -121.1000    8.3700   23.2300
5.00000    2.7000   -107.4800    8.8500   26.0700
5.50000    2.7800    -96.1700    9.3800   29.0000
6.00000    2.8900    -86.6200    9.9900   32.0700
6.50000    2.9900    -78.4300   10.6700   35.2700
7.00000    3.0800    -71.2800   11.4400   38.6400
7.50000    3.1800    -64.9800   12.3100   42.2200
8.00000    3.2800    -59.3500   13.3200   46.0300
8.50000    3.3900    -54.2900   14.4500   50.1100
9.00000    3.4900    -49.6700   15.7900   54.5000
9.50000    3.6000    -45.4500   17.3400   59.2900
10.00000   3.7100    -41.5600   19.1700   64.5400
10.50000   3.8300    -37.9500   21.3500   70.3500
11.00000   3.9500    -34.5700   24.0500   76.8400
11.50000   4.0800    -31.3900   27.3300   84.1400
12.00000   4.2200    -28.3900   31.4000   92.4400
12.50000   4.3600    -25.5400   36.6200  102.0500
13.00000   4.5000    -22.8500   43.6700  113.3700
```

Transducer impedance files - A valid cable impedance file is shown below.

probe1.xdr
7.5 Mhz xdcr with 19 pts start(mhz)  stop(mhz)  step(mhz)  no of pts  Design(mhz)
   1.0        10         .5         19          7.5
Cartesian
FREQ IN Mhz    REAL PART IN OHMS    IMAGINARY PART IN OHMS
   1.00              64.33                -1323.00
   1.50              47.10                 -882.23
   2.00              40.97                 -659.03
   2.50              32.23                 -521.00
   3.00              34.07                 -422.00
   3.50              33.20                 -344.33
   4.00              41.40                 -273.27
   4.50              86.30                 -205.60
   5.00             179.13                 -249.97
   5.50              73.57                 -294.90
   6.00              42.20                 -217.53
   6.50              55.97                 -154.97
   7.00             108.67                  -94.47
   7.50             224.57                  -73.97
   8.00             337.37                 -345.43
   8.50             100.37                 -363.33
   9.00              43.27                 -294.60
   9.50              27.10                 -253.87
  10.00              19.50                 -226.87

System generator impedance files - A valid generator impedance file is shown below .

exam1.trm
example 1 trm  real/imag - 11 pts start(mhz)  stop(mhz)  step(mhz)  no of pts
   1.0        6.0         .5         11
Cartesian

| FREQ IN Mhz | REAL PART IN OHMS | IMAGINARY PART IN OHMS |
|---|---|---|
| *this data* | | |
| 1.0 | 280 | -105 |
| *obtained* | | |
| 1.5 | 280 | -105 |
| *from* | | |
| 2.0 | 250 | -109 |
| *customer* | | |
| 2.5 | 220 | -120 |
| 3.0 | 180 | -145 |
| 3.5 | 120 | -155 |
| 4.0 | 95 | -145 |
| 4.5 | 75 | -125 |
| 5.0 | 60 | -95 |
| 5.5 | 54 | -89 |
| 6.0 | 54 | -86 |

System receiver impedance files - A valid cable impedance file is shown below.

exam1.rcv
example 1 rcv   all real - 11 pts start(mhz) stop(mhz) step(mhz) no of pts
  1.0        6         .5        11
Cartesian

| FREQ IN Mhz | REAL PART IN OHMS | IMAGINARY PART IN OHMS |
|---|---|---|
| *this data* | | |
| 1.0 | 280 | -105 |
| *obtained* | | |
| 1.5 | 280 | -105 |
| *from* | | |
| 2.0 | 250 | -109 |
| *customer* | | |
| 2.5 | 220 | -120 |
| 3.0 | 180 | -145 |
| 3.5 | 120 | -155 |
| 4.0 | 95 | -145 |
| 4.5 | 75 | -125 |
| 5.0 | 60 | -95 |
| 5.5 | 54 | -89 |
| 6.0 | 54 | -86 |

STIMULUS WAVEFORM DATA FILE FORMAT

An example of a stimulus waveform follows. This files data points have been abbreviated to its first 15 time sample lines to save space in this document.

```
chirp.wav    file name
128          number of data points
-            this hyphen required
-            This hyphen required
128 point Stimulus Waveform with decreasing frequency  waveform description
0    first data point should be zero
1.10263360942E-15
0.680874277454
0.899953837152
0.996562611339
0.960293685677
0.534765358423
0.204632725519
-0.481753674102
-0.753425695426
-0.999714979365
```

```
        -0.949491219244
        -0.790155012376
        -0.235277822167
         0.095359298746
```

ERROR MESSAGES

1) ERROR OPENING FILE, PRESS ANY KEY TO CONTINUE

The file does not exist or is corrupt.

2) TO MANY DATA POINTS OR BAD DATA, PRESS ANY KEY TO CONTINUE

The file contains more than 128 data points or the data does not match the expected format.

3) NO CABLE FILE DATA AVAILABLE

A cable file has not been selected.

2) NO TRANSDUCER DATA AVAILABLE - IMPEDANCE IS SELECTED

No transducer file has been entered.

3) NO TRANSDUCER DATA AVAILABLE - LUMPED ELEMENTS IS SELECTED

Lumped element network selected, but none entered.

4) NO RECEIVER DATA AVAILABLE - IMPEDANCE IS SELECTED

No receiver file has been entered.

5) NO RECEIVER DATA AVAILABLE - LUMPED ELEMENTS IS SELECTED

Lumped element network selected, but none entered.

6) NO TRANSMITTER DATA AVAILABLE - IMPEDANCE IS SELECTED

No transmitter file has been entered.

7) NO TRANSMITTER DATA AVAILABLE - LUMPED ELEMENTS IS SELECTED

Lumped element network selected, but none entered.

8) NO CABLE LENGTH SELECTED

No design cable length selected.

9) TRANSDUCER FREQUENCY INCREMENT IS NOT CONSISTENT WITH CABLE

The transducer impedance data sampled frequency increment does not match that of the cable.

10) RECEIVER FREQUENCY INCREMENT IS NOT CONSISTENT WITH CABLE

The receiver impedance data sampled frequency increment does not match that of the cable.

11) TRANSMITTER FREQUENCY INCREMENT IS NOT CONSISTENT WITH CABLE

The transmitter impedance data sampled frequency increment does not match that of the cable.

12) CABLE START FREQ IS NOT A MULTIPLE OF FREQ INCREMENT

The cables start frequency is not equal to a multiple frequency increment away from the lowest frequency of all the selected data files.

13) TRANSDUCER START FREQ IS NOT A MULTIPLE OF FREQ INCREMENT

The cables start frequency is not equal to a multiple frequency increment away from the lowest frequency of all the selected data files.

14) RECEIVER START FREQ IS NOT A MULTIPLE OF FREQ INCREMENT

The cables start frequency is not equal to a multiple frequency increment away from the lowest frequency of all the selected data files.

15) TRANSMITTER START FREQ IS NOT A MULTIPLE OF FREQ INCREMENT

The transmitters start frequency is not equal to a multiple frequency increment away from the lowest frequency of all the selected data files.

16) CABLE FREQUENCY DATA DOES NOT MATCH FREQ INCREMENT

The software has detected 2 consecutive frequency data points in a file whose difference does not equal the frequency increment previously calculated from the difference between the first frequency point (start frequency) and the second frequency point.

17) TRANSDUCER FREQUENCY DATA DOES NOT MATCH FREQ INCREMENT

See error 16 description.

18) RECEIVER FREQUENCY DATA DOES NOT MATCH FREQ INCREMENT

See error 16 description.

19) TRANSMITTER FREQUENCY DATA DOES NOT MATCH FREQ INCREMENT

See error 16 description.

UTILITY SOFTWARE

To use the utilities, first switch to the matche\utility directory.

example:  matche directory is on drive C
          type cd c:\matchf\utility mcoax.exe Calibrate the impedance analyzer using doc #100-96016-00. Copy mcoax.exe to the asset #322. On asset #322, type the name mcoax with no command line parameters at the DOS prompt. The following information will be displayed. Then enter mcoax again with the proper arguments.

COMMAND LINE ARGUMENTS ARE AS FOLLOWS

DATA FILE NAME - NO EXTENSION
STEP FREQUENCY IN Mhz - to no more than 5 decimal places
START FREQUENCY IN Mhz - to no more than 5 decimal places STOP FREQUENCY IN Mhz - to no more than 5 decimal places
CAPACITANCE PER FOOT OF CABLE IN Pfs
LENGTH OF CABLE UNDER TEST (in inches)

EXAMPLE: mcoax cable .1 10 32 85 mxdcr.exe

Calibrate the impedance analyzer using doc #
Copy mxdcr.exe to the asset #322. On asset #322, type the name mxdcr with no command line parameters at the DOS prompt. The following information will be displayed. Then enter mcoax again with the proper arguments.

COMMAND LINE ARGUMENTS ARE AS FOLLOWS

DATA FILE NAME - NO EXTENSION
STEP FREQUENCY IN Mhz - to no more than 5 decimal places
START FREQUENCY IN Mhz - to no more than 5 decimal places
STOP FREQUENCY IN Mhz - to no more than 5 decimal places
DESIGN FREQUENCY OF TRANSDUCER UNDER TEST IN Mhz EXAMPLE: mxdcr xdcr .1 10 7.5 makedisk.exe
Format a 1.44 or 1.2 Mbyte floppy disk using DOS 5.0 or greater and insert it in the appropriate drive.

type makedisk at the DOS command prompt. The utility will make a limited capability demo disk. Readme.txt on the demo disk route directory contains install procedure.

While we have described our invention in connection with specific embodiments thereof, it is clearly to be understood that this is done only by way of example and not as a limitation to the scope of our invention as set forth in the objects thereof and in the appended claims.

We claim:

1. A method of providing ultrasound electrical impedance matching circuits, for use in order to evaluate the effectiveness of the operating circuit, comprising the steps of:

storing in a software package an electrical model of an ultrasound system in a transmitting mode which gives values to a system generator output voltage, a system output impedance, a transducer input impedance, a voltage at the transducer and a cable system;

storing in a software package an electrical model of an ultrasound system in a receiving mode which gives values to the impedance of the receiver, the transducer output impedance, the transducer's induced voltage, the voltage at the receiver and the cabling system;

modeling the transducer and the transmitting/receiving switch;

determining design frequency impedances;

calculating a cable characteristics impedance at a design frequency from a measured cable input data;

determining a cable matrix at the design frequency;

assigning a system receiver impedance to a cable length and calculating a input impedance to a cable and receiver;

assigning a transducer electrical impedance to source impedance calculating output impedance of a transducer and cable;

determining an end to insert the matching network;

transforming the transducer or transmitting/receiving switch to the other end of the transmission line;

calculating the matching network comprised of inductors and capacitors with a specific design method based upon fixed and transformed impedances;

inserting the matching network into the ultrasound system; and analyzing and evaluating the ultrasound system.

2. A method of providing ultrasound electrical impedance matching circuits, according to claim 1, wherein:

said storing in a software package an electrical model of an ultrasound system in the transmitting mode step comprises the step of giving a value of Vg to a system generator output voltage, the value of Zg to a system output impedance, the value of X1 to the transducer input impedance, the value of Vx to the voltage at the transducer and cable is an ultrasound cabling system.

3. A method of providing ultrasound electrical impedance matching circuits, according to claim 2, wherein:

said storing in a software package an electrical model of an ultrasound system in the transmitting mode step comprises the use of the following parameters including the design frequency, the cable and the transducer impedance list, a piezoelectric parameter, the transmitting and receiving elements, a cable length and a network type.

4. A method of providing ultrasound electrical impedance matching circuits, according to claim 1, wherein:

said storing in a software package an electrical model of an ultrasound system in the receiving mode step comprises the step of giving a value of Zr to the impedance of the receiver, a value of X1 to the transducer output impedance, a value of Vx to the transducer's induced voltage, a value of Vr to the voltage at the receiver.

5. A method of producing ultrasound electrical impedance matching circuits, according to claim 4, comprising:

said storing in a software package an electrical model of an ultrasound system in the receiving mode step comprises the use of the following parameters including signal to noise ratio, a two way impulse response of the ultrasound system, a cable, the transducer electrical port, a convolution of the system response with real stimulus and the designed schematics.

6. A method of producing ultrasound electrical impedance matching circuits, according to claim 1, wherein:

said modeling the transducer and the transmitting/receiving switch step comprises the use of a transmission line theory.

7. A method of producing ultrasound electrical impedance matching circuits, according to claim 1, wherein:

said analyzing and evaluating the ultrasound system step comprises activating the method's software; and said activating the method's software step comprises the steps of entering coaxial cable parameters, entering the transducer parameters, entering the system transmitter parameters, entering the system receiver parameters, entering the matching network design parameters entering the user supplied matching network values, selecting stimulus options, displaying the input parameters, computing the matching network, displaying the calculated matching network, calculating and plotting two way voltage transfer function, calculating and plotting the signal to noise ratio, calculating and plotting the two way impulse response, calculating and plotting a convolution with a stimulus, editing an ASCII data file, retrieving the default input settings, saving current input settings to a disk, retrieving the input settings from the disk and returning out of a program.

* * * * *